(12) United States Patent
Lucaora

(10) Patent No.: US 9,182,009 B2
(45) Date of Patent: Nov. 10, 2015

(54) REDUCED WEIGHT WHEEL CONFIGURED FOR USE WITH VALVE STEM AND OR TIRE SENSOR

(71) Applicant: Wheel Pros, LLC, Lakewood, CO (US)

(72) Inventor: Luigi Lucaora, Trebaseleghe (IT)

(73) Assignee: Wheel Pros, LLC, Greenwood Village, CO (US)

( * ) Notice: Subject to any disclaimer, the term of this patent is extended or adjusted under 35 U.S.C. 154(b) by 386 days.

(21) Appl. No.: 13/662,657

(22) Filed: Oct. 29, 2012

(65) Prior Publication Data

US 2014/0116593 A1   May 1, 2014

(51) Int. Cl.
*F16F 15/32* (2006.01)
*B60B 21/02* (2006.01)
*B60C 23/04* (2006.01)

(52) U.S. Cl.
CPC ............ *F16F 15/324* (2013.01); *B60B 21/02* (2013.01); *B60C 23/0494* (2013.01); *B60B 2320/30* (2013.01); *B60B 2900/113* (2013.01); *B60B 2900/523* (2013.01); *B60B 2900/541* (2013.01); *Y10T 29/49526* (2015.01)

(58) Field of Classification Search
CPC .... B60B 21/00; B60B 21/02; B60B 2320/30; B60B 2900/111; B60B 2900/131; F16F 15/32; F16F 15/324; B21D 53/26; Y10T 29/49526; B60C 29/00; B60C 23/0494
USPC .................... 152/415, 427; 301/5.21, 95.101; 29/894.351
See application file for complete search history.

(56) References Cited

U.S. PATENT DOCUMENTS

| 8,007,052 | B2 * | 8/2011 | Passarotto et al. | 301/5.21 |
| 2004/0032161 | A1 * | 2/2004 | Smyth | 301/9.1 |
| 2008/0164750 | A1 * | 7/2008 | Vanetta | 301/5.21 |
| 2013/0152395 | A1 * | 6/2013 | Furukawa et al. | 29/894.35 |

FOREIGN PATENT DOCUMENTS

| DE | 10228164 C1 * | 8/2003 |
| JP | 2002240501 A * | 8/2002 |
| JP | 2002283801 A * | 10/2002 |
| JP | 2003094902 A * | 4/2003 |
| JP | 2007276784 A * | 10/2007 |
| WO | WO 2012043350 A1 * | 4/2012 |

* cited by examiner

*Primary Examiner* — Kip T Kotter
(74) *Attorney, Agent, or Firm* — Garcia-Zamor IP Law; Ruy M. Garcia-Zamor

(57) ABSTRACT

A wheel having a recess thereon to offset the weight of a valve stem and/or a tire sensor so that the wheel will be balanced for normal operational use on a vehicle.

10 Claims, 2 Drawing Sheets

REDUCED WEIGHT WHEEL CONFIGURED FOR USE WITH VALVE STEM AND OR TIRE SENSOR

BACKGROUND

The present invention is generally directed to wheels for use on automobiles and other vehicles and, more specifically, to wheels that preferably do not require the placement of weights along the rim to compensate for the weight of valve stems or tire sensors.

Typically, wheels and their associated tires are spun balanced prior to placement on a vehicle. This balancing ensures optimal operation and reduced wear on the tire during operation of the associated vehicle. Conventionally, weights are added along the rim of a wheel to compensate for uneven weight distribution so that the wheel is properly balanced during the spin balancing or similar test.

The above procedure is even more important in racing or high-performance vehicles where the valve stem may be alloy and the tire sensor is more likely to be included. With racing or other high-performance vehicles minimal weight is optimal for maximum performance and handling with minimal fuel consumption. As such, the necessary adding of weights along the rim of a wheel to compensate for the weight of a high-performance valve stem and tire sensor creates an undesirable situation.

It may be advantageous to provide a wheel that is preferably configured to allow the addition of a valve stem and/or tire sensor without requiring the placement of additional weights along the rim thereof for proper balancing, that reduces the overall weight of the wheel and tire, that reduces the overall fuel consumption of the associated vehicle, and/or that may improve the mileage of vehicles using the wheel.

SUMMARY

Briefly speaking, one embodiment of the present invention is directed to a wheel system including a wheel body having a rim located about a hub. The rim has inner and outer surfaces and defines a bore which extends therethrough. The outer surface is configured to receive a tire thereon. A valve stem is located within the bore of the rim. A tire sensor is located on the wheel. The rim defines a recess located along the inner surface. The recess is configured to reduce the weight of the wheel to generally offset the increase in weight created by the valve stem and the tire sensor so that the weight of the combination of the wheel, valve stem, and tire sensor is balanced for normal operational use without needing additional weights positioned along the rim for balancing.

In a separate aspect, one embodiment of the present invention is directed to a method of manufacturing a wheel. The method including the steps of: providing a wheel body comprising a rim located about a hub, the rim having inner and outer surfaces, the wheel body being configured to receive a valve stem and a tire sensor; forming a recess in the rim to reduce the weight of the wheel and generally offset any increase in weight created once the valve stem and the tire sensor are attached to the wheel such that the wheel is balanced for normal operation without the need of positioning additional weights along the rim for balancing.

In another aspect, the present invention is directed to a method of using a wheel. The method including the steps of: providing a wheel body comprising a rim located about a hub, the rim having inner and outer surfaces, the wheel body being configured to receive a valve stem and a tire sensor; providing a recess in the rim to reduce the weight of the wheel and generally offset any increase in weight created once the valve stem and the tire sensor are positioned on the wheel such that the wheel is balanced for normal operational use without the need of positioning additional weights along the rim for balancing.

In another aspect, the present invention is directed to a wheel including a wheel body having a rim located about a hub. The rim having inner and outer surfaces and defining a bore which extends therethrough. The outer surface is configured to receive a tire thereon. The rim defines a recess located along the inner surface. The recess is configured to reduce the weight of the wheel to generally offset the increase in weight created by the valve stem and the tire sensor to be used with the wheel so that the weight of the combination of the wheel, valve stem, and tire sensor when later combined is balanced without needing to position additional weights along the rim of the wheel.

In another aspect, the present invention is directed to a wheel including a wheel body having a rim located about a hub. The rim defines a recess therein and/or thereon. The recess is configured to reduce the weight of the wheel to generally offset an expected increase in weight created by a valve stem and/or a tire sensor expected to be used with the wheel so that the weight of the combination of the wheel, valve stem, and/or tire sensor when later combined is balanced for normal operational use on a vehicle without needing to position additional weights along the rim of the wheel for correct balancing.

In another aspect, the present invention is directed to a wheel defining a recess therein and/or thereon. The recess is configured to reduce the weight of the wheel to generally offset an expected increase in weight created by a valve stem and/or a tire sensor expected to be used with the wheel so that the weight of the combination of the wheel, valve stem, and/ or tire sensor when later combined is balanced for normal operational use on a vehicle without needing further correction to the wheel balance.

BRIEF DESCRIPTION OF THE SEVERAL VIEWS OF THE DRAWINGS

The foregoing summary, as well as the following detailed description of the preferred embodiment of the present invention will be better understood when read in conjunction with the appended drawings. For purposes of illustrating the invention, there is shown in the drawings, an embodiment which is presently preferred. It is understood, however, that the invention is not limited to the precise arrangements and instrumentalities shown. In the drawings.

DETAILED DESCRIPTION OF THE PREFERRED EMBODIMENT

Figure 1:
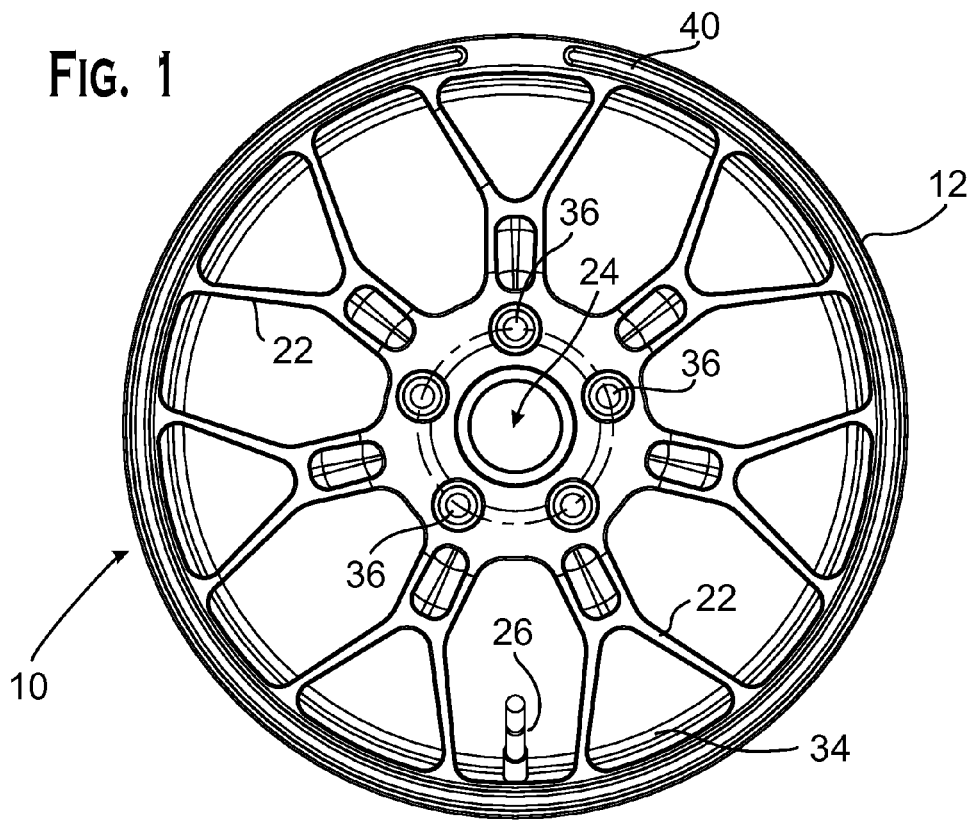
FIG. 1 is a top plan view of a preferred embodiment of a wheel according to the present invention; the wheel 10 preferably includes a wheel body 12 having a rim 14 located about a hub 20; the rim 14 may be connected to the hub 20 via one or more spokes 22; alternatively, any suitable method may be used to connect the rim 14 to the hub 20 without departing from the scope of the present invention; a valve stem 26 is shown; while a preferred wheel design is shown for purposes of example, those of ordinary skill in the art will appreciate from this disclosure that any wheel design can be used in conjunction with the present invention.

Certain terminology is used in the following description for convenience only and is not limiting. The words "right," "left," "upper," and "lower" designate directions in the drawings to which reference is made. The words "inwardly" and "outwardly" refer to directions toward and away from, respectively, the geometric center of the wheel and designated parts thereof. The terminology includes the words above specifically mentioned, derivatives thereof, and words of similar import. Additionally, the words "a" and "one" are defined as including one or more of the referenced item unless specifically stated otherwise.

Referring to FIGS. 1-5, wherein like numerals indicate like elements throughout, a preferred embodiment of a wheel is shown and designated as 10. Briefly stated, the wheel 10 is preferably adapted to provide proper balance after the mounting of a tire, valve stem 26, and/or tire sensor 32 without the need for additional placement of weights along the rim or other balance correction.

The wheel 10 and its component parts are preferably formed from a high-strength, durable material, such as steel, aluminum, other alloy, or any other suitable material. However, those of ordinary skill in the art will appreciate from this disclosure that the wheel 10 and its various components can be formed from any suitable materials without departing from the scope of the present invention.

Referring to FIG. 1, a preferred embodiment of the wheel 10 according to the present invention is shown. The wheel 10 preferably includes a wheel body 12 having a rim 14 located about a hub 20. The rim 14 preferably extends circumferentially about the hub 20. The hub 20 is preferably generally circular and defines a mounting hole 24 therethrough for receiving a vehicle axle. Although five bolt holes 36 are shown for securing the hub 20 in position on the vehicle, those of ordinary skill in the art will appreciate that any number of bolt holes 36 or any suitable connection means can be used without departing from the scope of the present invention.

The rim 14 may be connected to the hub 20 via one or more spokes 22. Although the exemplary wheel shows seven spokes 22 used to connect the hub 20 to the rim 14, those of ordinary skill in the art will appreciate from this disclosure that any number of spokes 22 may be used without departing from the scope of the present invention. Alternatively, any suitable non-spoke method may be used to connect the rim 14 to the hub 20 without departing from the scope of the present invention.

Figure 5:
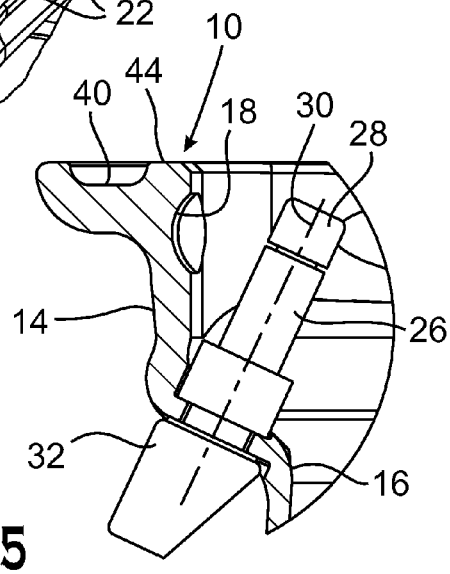
FIG. 5 is a cross-sectional view of the wheel of FIG. 1 as taken along the lines 5-5 of FIG. 4; the cross-section is taken along the center of the valve stem 26 as further illustrated by valve stem central axis 30; it is preferred, but not necessary, that the recess 18 is located proximate to a lateral edge 44 of the wheel 10 between the valve stem 26 and the lateral edge 44 of the wheel 10; while the cross-sectional view of the recess 18 shows an arcuate curvature of the recess base, those of ordinary skill in the art will appreciate from this disclosure that the recess 18 can be formed to have any shape and size or any cross-sectional shape without departing from the present invention.

A valve stem 26 is shown and may include valve stem cap 28 thereon. Referring to FIG. 5, the valve stem 26 is preferably positioned through the rim 14 and is oriented at a generally forty degree (40°) angle relative to a horizontal plane defined by the lateral edge 44 of the wheel 10. The valve stem 26 may preferably be located in the shoulder formed by a generally S-shaped bend in the rim 14 (as shown in FIG. 5). Those of ordinary skill in the art will appreciate that any suitable placement of the valve stem 26 can be used without departing from the scope of the present invention. While a preferred wheel design is shown for purposes of example, those of ordinary skill in the art will appreciate from this disclosure that any wheel 10 design can be used in conjunction with the present invention.

Figure 2:
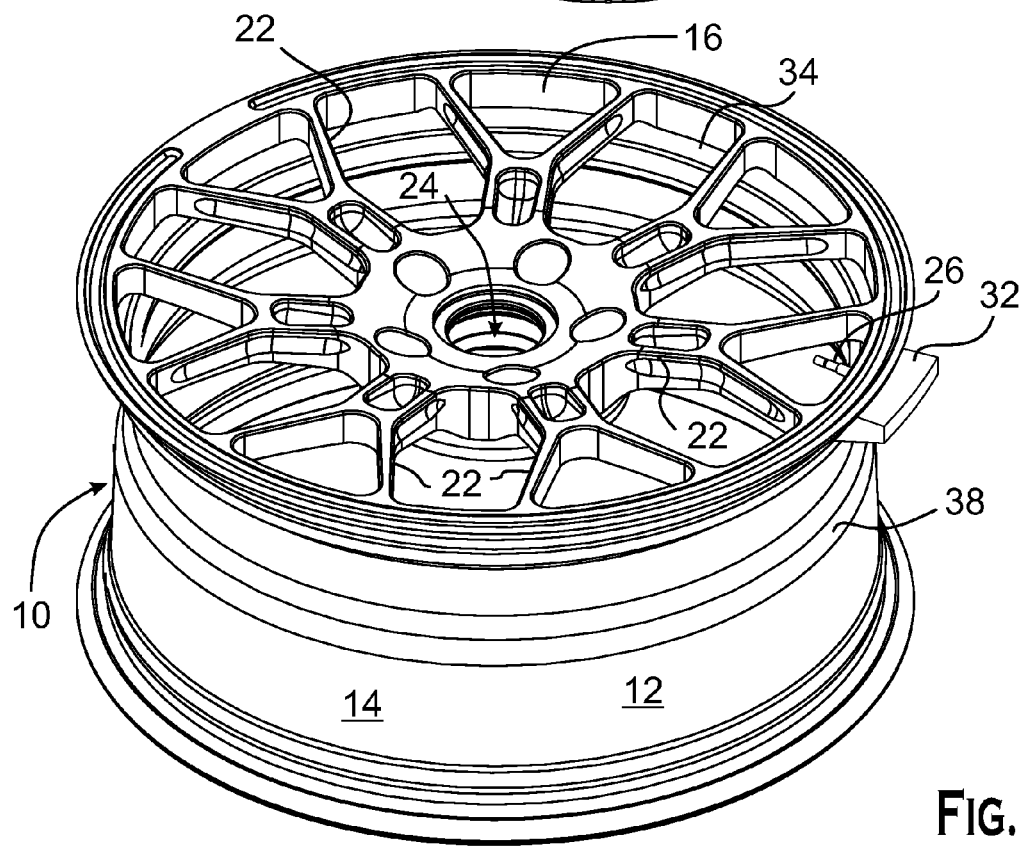
FIG. 2 is a perspective view of the wheel of FIG. 1 illustrating a preferred positioning of a tire sensor 32 on a valve stem 26; the valve stem 26 preferably extends through a bore in the rim 14; alternatively, the tire sensor 32 can be positioned in another location without departing from the scope of the present invention.

Referring to FIG. 2, a preferred positioning of a tire sensor 32 on a valve stem 26 is shown. The valve stem 26 preferably extends through a bore in the rim 14 with the tire sensor 32 located along the outer surface of the rim 14. Alternatively, the tire sensor 32 can be positioned in another location without departing from the scope of the present invention. The tire sensor 32 preferably measures the pressure within the tires. However, the tire sensors 32 may also or alternatively measure other properties, such as temperature or humidity or any other properties of interest without departing from the scope of the present invention. Referring to FIG. 5, the tire sensor 32 is preferably mounted generally flush with a portion of the outer surface the rim 14 and preferably disposed adjacent to the radial face 34. Any suitable positioning or mounting mechanism for the tire sensor 32 may be used without departing from the scope of the present invention.

Figure 3:
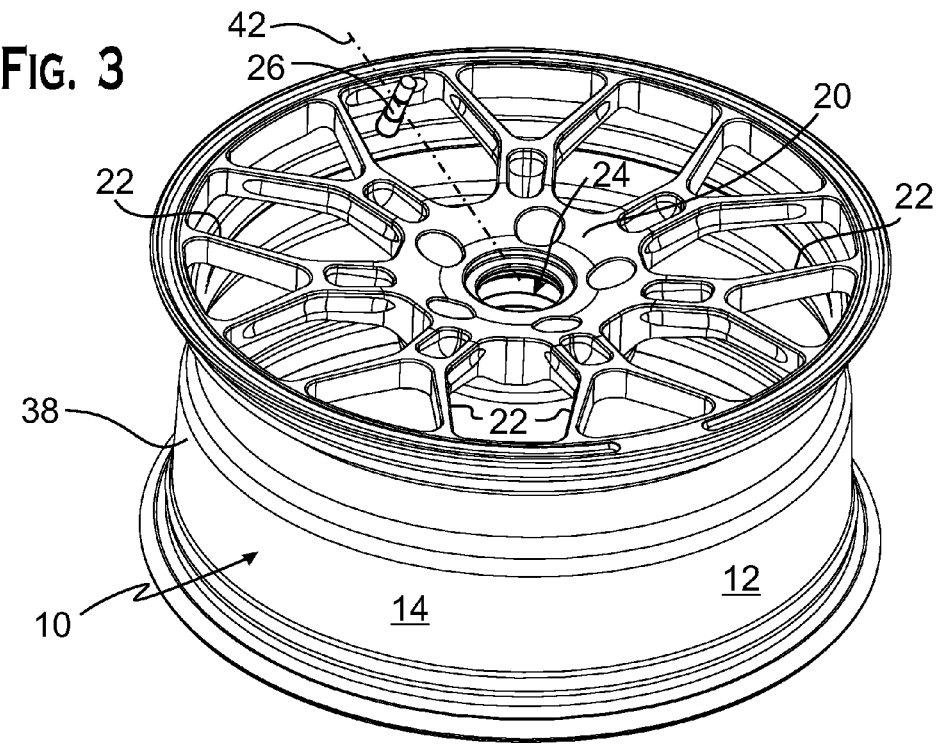
FIG. 3 is a second perspective view of the wheel of FIG. 1 illustrating a recess 18 defined by the rim 14 along an inner surface 16; the recess 18 may be positioned at another location than that shown or its equivalent may be formed as a hollow chamber entirely within the rim 14 without departing from the scope of the present invention; the recess 18 is preferably configured to reduce the weight of the wheel 10 to offset the increase in weight created by the valve stem 26 and/or the tire sensor 32 such that the weight of the combination of the wheel 10, the valve stem 26, and/or the tire sensor 32 is balanced for normal operational use without needing additional weights positioned along the rim 14 for balancing; conventionally, the balancing of wheel weight prior to use is achieved via spin balancing during which procedure weight is added along the rim until the proper balance is achieved; using the recess 18 defined by the rim 14 to ensure that the wheel is properly balanced without the need of additional weights lowers the overall weight of the wheel 10 and associated vehicle; a radial axis is shown and labeled with reference numeral 42; it is preferred, but not necessary that the recess 18 and the valve stem 26, are located along a common radial axis 42 of the wheel 10 such that they share a common inner face of the wheel.

Referring to FIG. 3, a recess 18 is preferably defined by the rim 14 along an inner surface 16 of the rim 14. The recess 18 may be positioned at another location other than that shown. Similarly, its equivalent may be formed as a hollow chamber entirely within a localized area in the rim 14 without departing from the scope of the present invention. The recess 18 is preferably configured to reduce the weight of the wheel 10 to generally offset the increase in weight created by the valve stem 26 and/or the tire sensor 32 such that the weight of the combination of the wheel 10, the valve stem 26, and/or the tire sensor 32 is balanced for normal operational use without needing additional weights positioned along the rim 14 for balancing or without needing further corrective measures. The recess 18 defined by the rim 14 helps to ensure that the wheel is properly balanced without the need of additional weights and lowers the overall weight of the wheel 10 and associated vehicle. This advantage is significant for high-performance vehicles, hybrid vehicles, electric vehicles, and, especially, for racing vehicles for which weight is a critical factor.

Referring still the FIG. 3, a radial axis 42 is shown. It is preferred, but not necessary, that the recess 18 and the valve stem 26 are located along a common radial axis 42 of the wheel 10. Referring to FIG. 5, it is also preferable that the recess 18 is located generally proximate to the valve stem 26 to simplify proper weighting and balancing. Referring again to FIG. 3, the outer surface of the rim 14 preferably forms a channel 38 that is generally U-shaped to receive a tire thereon.

Figure 4:
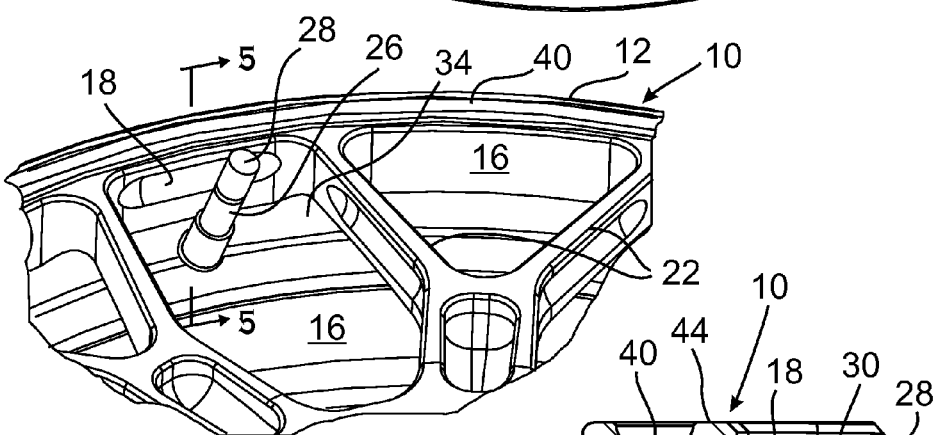
FIG. 4 is an enlarged broken away view of the wheel of FIG. 3 illustrating a preferred configuration of the recess 18; it is preferred, but not necessary that the recess 18 have an elongated shape extending along a circumferential direction along an inner surface 16 of the rim 14; however those of ordinary skill in the art will appreciate from this disclosure that the configuration of the recess 18 can be varied without departing from the scope of the present invention.

Referring to FIG. 4, a preferred configuration of the recess 18 is shown. It is preferred, but not necessary, that the recess 18 have an elongated shape extending along a circumferential direction along an inner surface 16 of the rim 14. The recess 18 preferably has a generally oval-shape and rounded cross-section (shown in FIG. 5) which minimizes dirt capture and simplifies cleaning, such that the recess 18 does not extend all the way through the material of the rim 14. Although a particular shape is shown in FIG. 4, those of ordinary skill in the art will appreciate that any desired shape or configuration of the recess can be used with the wheel 10 without departing from the scope of the present invention.

Referring to FIG. 5, it is preferred, but not necessary, that the recess 18 is located proximate to a lateral edge 44 of the wheel 10 between the valve stem 26 and the lateral edge 44 of the wheel 10. A groove 40 may also be disposed along the lateral edge 44 of the wheel 10. It is further preferred that the height of the recess 18 on the wheel, as viewed in FIG. 5, is selected such that the recess 18 is generally coplanar with a portion of the valve stem 26 in a plane that is oriented generally parallel to that formed by lateral edge 44 of the wheel 10. While the cross-sectional view of the recess 18 shows an arcuate curvature of the recess base, those of ordinary skill in the art will appreciate from this disclosure that the recess 18 can be formed to have any shape, size, and/or any cross-sectional shape without departing from the present invention.

The size of the recess 18 may depend upon the density of the material forming the wheel 10, the expected weight of the valve stem 26, the size of the bore into which the valve stem is positioned (which may reduce weight at the location of the valve stem), and/or the expected weight of the tire sensor. It is preferred that the weight of the wheel 10 is reduced by between approximately seven grams and approximately thirteen grams by the recess 18 proximate the inner surface 16 of the rim 14. It is further preferred that the weight of the wheel 10 is reduced by between approximately nine grams and approximately eleven grams by the recess 18 proximate the inner surface 16 of the rim 14. It is more preferred still that the weight of the wheel 10 is reduced by approximately ten grams by the recess 18 proximate the inner surface 16 of the room 14. It is understood that the term approximately as used in conjunction with the above weights generally means within the given weight plus or minus zero point nine (0.9) grams. It is also understood that in discussing the reduction of the weight of the wheel, by necessity what is being calculated is the size of the recess 18 (i.e., the volume of wheel material removed due to the recess).

Preferred methods of manufacturing and/or using a wheel according to the present invention are described below. Those of ordinary skill in the art will appreciate from this disclosure that generally similar steps and generally similar structural components of the wheel 10 described below should: generally have similar structure, general include similar alternate constructions, and generally operate in a similar manner as that described above, unless stated otherwise. The steps of the method of the present invention can be performed in any order, interchanged with other steps, or omitted, without departing from the scope of the present invention.

One preferred method of manufacturing a wheel 10 according to the present invention includes the step of providing a wheel body 12 comprising the rim 14 located about 20. The rim 14 has inner and outer surfaces. The wheel body 12 is configured to receive a valve stem 26 and a tire sensor 32.

The method also includes the step of forming a recess 18 in the rim 14 to reduce the weight of the wheel 10 and generally offset any increase in weight created once the valve stem 26 and the tire sensor 32 are attached to the wheel 10 such that the wheel 10 is balanced for normal operation without the need of positioning additional weights along the rim 14 for balancing.

The method may also include the step of adding the valve stem 26 and the tire sensor 32 to the wheel 10. This method may further include the step of positioning the recess 18 and the valve stem 26 along a common radial axis of the wheel. While it is preferred that each of the above components are symmetrically positioned about the radial axis 42, it is understood that even if only a portion of each of the recess 18, valve stem 26, and tire sensor 32 are located along the radial axis 42 that the components are considered to be aligned thereon. The method of manufacturing a wheel may also include the step of forming the recess 18 such that the recess 18 is located proximate to a lateral edge 44 (as shown in FIG. 5) of the wheel 10 between the valve stem 26 and the lateral edge 44 of the wheel 10.

One method of using a wheel 10 according to the present invention includes the step of providing a wheel body 12 comprising the rim 14 located about a hub 20. The rim 14 preferably has inner and outer surfaces. The wheel body 10 may be configured to receive a valve stem 26 and the tire sensor 32. This method preferably also includes the step of providing a recess 18 in the rim 14 to reduce the weight of the wheel 10 and generally offset any increase in weight created once the valve stem 26 and the tire sensor 32 are positioned on the wheel 10 such that the wheel 10 is balanced for normal operational use without the need of positioning additional weights along the rim 14 for balancing. Those of ordinary skill in the art will appreciate from this disclosure that the term "generally" as used in conjunction with the word "offset" above (and in the claims below) is understood to mean that while the weight distribution of the wheel 10 about its rotational axis may not be perfect, that it is within the tolerance level normally used for the particular vehicle and/or particular events in which vehicles of that sort are used.

This method may include the step of adding a valve stem 26 and tire sensor 32 to the wheel. This step may also include forming the recess such that it is located proximate to a lateral edge 44 of the wheel 10 between the valve stem 26 and the lateral edge 44 of the wheel 10.

One embodiment of the present invention operates as follows. A wheel 10 has a recess 18 located thereon. The recess 18 is preferably located proximate to the valve stem 26 and to a tire sensor 32. The recess 18 preferably reduces enough wheel material such that the reduction in weight of the wheel 10 generally offsets the added weight of the valve stem 26 and the tire sensor 32. It is also preferred, but not necessary, that the recess 18 is generally located proximate to both the valve stem 26 and/or the tire sensor 32 such that the positioning of the weights (both the reductions and the additions) are located generally along a common section of the rim 14 such that the wheel is properly balanced about the hub 20.

It is recognized by those skilled in the art, that changes may be made to the above described embodiment of the invention without departing from the broad inventive concept thereof. For example, although an automobile wheel is shown in the drawings, it is understood that this invention may be practiced with motorcycle wheels, all-terrain vehicle wheels, or any other suitable type of vehicle. It is understood, therefore, that this invention is not limited to the particular embodiment disclosed, but is intended to cover to all modifications which are within the spirit and scope of the invention as defined by the appended claims and the drawings.

What is claimed is:

1. A wheel system comprising:
    a wheel body comprising a rim located about a hub, the rim having inner and outer surfaces and defining a bore which extends therethrough, the outer surface configured to receive a tire thereon;
    a valve stem located within the bore of the rim;
    a tire sensor located on the wheel body;
    the rim defining a recess located along the inner surface, such that the recess is configured to reduce the weight of the wheel to generally offset the increase in weight created by the valve stem and the tire sensor so that the weight of the combination of the wheel, valve stem, and tire sensor is balanced for normal operational use without needing additional weights positioned along the rim for balancing, wherein
    the recess and the valve stem are disposed along a shared inner face of the wheel such that the valve stem and the recess are located on a common radial axis of the wheel;
    the recess is disposed on the wheel such that the recess does not extend through a material of the wheel.

2. The wheel system of claim 1, wherein the weight of the wheel is reduced by between approximately seven grams and approximately thirteen grams by the recess in the inner surface of the rim.

3. The wheel system of claim 2, wherein the weight of the wheel is reduced by between approximately nine grams and approximately eleven grams by the recess in the inner surface of the rim.

4. The wheel system of claim 3, wherein the weight of the wheel is reduced by approximately ten grams by the recess in the inner surface of the rim.

5. The wheel system of claim 1, wherein the recess is located proximate to a lateral edge of the wheel between the valve stem and the lateral edge of the wheel.

6. A method of manufacturing a wheel, comprising:
    providing a wheel body comprising a rim located about a hub, the rim having inner and outer surfaces, the wheel body being configured to receive a valve stem and a tire sensor;
    adding the valve stem and tire sensor to the wheel;
    forming a recess in the rim to reduce the weight of the wheel and generally offset any increase in weight created once the valve stem and the tire sensor are attached to the wheel such that the wheel is balanced for normal operation without the need of positioning additional weights along the rim for balancing, wherein
    the step of forming the recess further comprises the recess and the valve stem being disposed along a shared inner face of the wheel such that the valve stem and the recess are located on a common radial axis of the wheel and wherein the step of forming a recess further comprises the recess being disposed on the wheel such that the recess does not extend through a material of the wheel.

7. The method of claim 6, wherein the step of forming a recess further comprises the recess being located proximate to a lateral edge of the wheel between the valve stem and the lateral edge of the wheel.

8. A method of using a wheel, comprising:
    providing a wheel body comprising a rim located about a hub, the rim having inner and outer surfaces, the wheel body being configured to receive a valve stem and a tire sensor;
    adding the valve stem and tire sensor to the wheel;
    providing a recess in the rim to reduce the weight of the wheel and generally offset any increase in weight created once the valve stem and the tire sensor are positioned on the wheel such that the wheel is balanced for normal operational use without the need of positioning additional weights along the rim for balancing, wherein
    the step of providing the recess further comprises the recess and the valve stem being disposed along a shared inner face of the wheel such that the valve stem and the recess are located on a common radial axis of the wheel, and wherein the step of providing a recess further comprises the recess being disposed on the wheel such that the recess does not extend through a material of the wheel.

9. A wheel comprising:
    a wheel body comprising a rim located about a hub, the rim having inner and outer surfaces and defining a bore which extends therethrough, the outer surface configured to receive a tire thereon; and
    the rim defining a recess located along the inner surface, wherein the recess is configured to reduce the weight of the wheel to generally offset the increase in weight created by a valve stem and a tire sensor to be used with the wheel so that the weight of the combination of the wheel, valve stem, and tire sensor when later combined is balanced without needing to position additional weights along the rim of the wheel, wherein
    the recess and the valve stem are disposed along a shared inner face of the wheel such that the valve stem and the recess are located on a common radial axis of the wheel and wherein the recess is disposed on the wheel such that the recess does not extend through a material of the wheel; and
    the valve stem and tire sensor attached thereto.

10. The wheel of claim 9, wherein the recess is located proximate to a lateral edge of the wheel between the valve stem and the lateral edge of the wheel.

* * * * *